United States Patent [19]

Kornylak

[11] 4,119,190
[45] Oct. 10, 1978

[54] LOW TEMPERATURE ROLLERWAY BRAKE
[75] Inventor: Edward T. Kornylak, Hamilton, Ohio
[73] Assignee: Kornylak Corporation, Hamilton, Ohio
[21] Appl. No.: 794,515
[22] Filed: May 6, 1977
[51] Int. Cl.² .......................................... B65G 13/075
[52] U.S. Cl. .................................................. 193/35 A
[58] Field of Search ...................... 193/35 A, 35 R, 37
[56] References Cited
U.S. PATENT DOCUMENTS

| 3,081,857 | 3/1963 | Krueger | 193/35 R |
|---|---|---|---|
| 3,095,956 | 7/1963 | McGill | 193/35 A |
| 3,312,320 | 4/1967 | Froio | 193/35 A |
| 3,443,674 | 5/1969 | Kornylak | 193/37 |
| 3,621,960 | 11/1971 | Kornylak | 193/35 A |
| 3,655,021 | 4/1972 | Froio | 193/35 A |
| 3,871,501 | 3/1975 | Kornylak | 193/35 A |
| 4,006,812 | 2/1977 | Kornylak | 193/37 |

Primary Examiner—Evon C. Blunk
Assistant Examiner—Jeffrey V. Nase
Attorney, Agent, or Firm—Beall & Jeffery

[57] ABSTRACT

For cold temperature storage on a gravity rollerway conveyor, the parallel flights of rollers of the rollerway conveyor each have a first group of rollers engaging the pallets in their storage position with surfaces having no appreciable compression set characteristics and a second group of rollers not in engagement with the pallets in their storage position but engaging the pallets when moving from one storage position to another storage position with elastomeric surfaces having appreciable compression set. The first group of rollers may be constructed with support surfaces that are rigid, while the second group of rollers may be constructed with support surfaces that are elastomeric with substantial hysteresis properties.

8 Claims, 3 Drawing Figures

LOW TEMPERATURE ROLLERWAY BRAKE

BACKGROUND OF THE INVENTION

The present invention relates to conveyors of the type wheren a plurality of serially arranged loaded pallets are supported during storage on and are moved by gravity down a rollerway conveyor comprising parallel flights of a plurality of rollers having parallel, coplanar and horizontal axes, and with the flights arranged in a generally common plane inclined in the direction of conveying. Such a rollerway gravity conveyor may be of the type as shown in the patent to Andrew T. Kornylak issued May 13, 1969 as U.S. Pat. No. 3,443,674.

The conveyor of the above-mentioned patent has a plurality of rollers with annular elastomeric tires mounted on hubs that are each mounted by roller bearings on an axle. The anti-friction bearing is used to reduce the rolling resistance of the roller and to try and keep the rolling resistance uniform over a range of different loads. The compressable tire is desirable to permit defects or other height variations in the pallet bottom surface to ride "through" the tire instead of having to climb over it. This results in a reduced slope requirement for gravity rollerways and a smoother pallet movement for all types of roller conveyors. It is desirable to maintain the slope of the gravity rollerway conveyor as small as possible while accomplishing the purposes of the conveyor, because as the slope is increased, there will be a corresponding increase in the acceleration of a loaded pallet freely moving down the rollerway; if no or a few pallets are on the rollerway and a loaded pallet is inserted at the upper end of the rollerway conveyor, a relatively large slope for the conveyor will mean that the loaded pallet will gain considerable speed as it moves down the rollerway conveyor to present a safety problem as well as a problem in trying to stop the loaded pallet at the bottom of the coveyor without damaging either the conveyor or the load.

Conveyor rollers with an annular resilient or elastomeric tire may be constructed so as to have a substantial amount of hysteresis, which is the ability of the tire to absorb energy from the load to control the speed of the movement of a load down a gravity conveyor, particularly, to absorb more energy with higher speed to either slow down a fast moving load or prevent a load from building up speed as it moves down a gravity rollerway conveyor. An example of such high hysteresis is found in the United States patent to Andrew T. Kornylak issued Nov. 23, 1971 as U.S. Pat. No. 3,621,960. Such hysteresis rollers provide effective speed control for a specific range of loads. However, it has been found that in cold temperature environments (cold temperature is defined herein as temperatures below freezing), the elastomeric materials have very substantial compression set properties. Compression set is measured according to ASTM Test Method B. Elastomerical resilient materials for constructing the tires of the rollers of a gravity rollerway conveyor are most successful when they employ the lowest compression set while at the same time having the remaining desirable characteristics of such tires, and it is desirable that compression set be 5% or less (ASTM Test Method B), which is defined herein as no appreciable compression set. However, tires having a compression set of 5% or less at room temperature take on a vary substantial compression set in cold temperature storage and many times when the load is removed, a flat spot remains on the tire regardless of the amount of time allowed for recovery of the tire. Also, the recovery may be sufficiently slow such that movement of the pallets one space in the storage serial array may be finished before the tire has recovered sufficiently from its compression set, so that the flat spot will be present during movement of the pallets. Futher, with compression set of the tires during storage, it is extremely difficult to start up the remaining pallets upon removal of the lowermost pallet, and for this reason it may be necessary to increase the slop of the conveyor beyond that which is otherwise desirable.

The compressability of the tire, which may be measured as its percent of compression for a given load has nothing to do with its compression set, which compression set as related to the amount of time needed for recovery of the tire to its original shape after the load is removed. A further characteristic of an elastomeric tire is its hardness, and it has been found desirable that elastomeric tires have a range of hardness of 65A to 90A Shore durometer. Tire hardness is not necessarily related to compression set. The creep characteristics of a tire used on a rollerway conveyor are such that as a load remains on a tire, the deflection of the tire gradually increases. When the load is removed, the tire shows a flat spot, which does not return to the original cylindrical shape within a reasonable time. This flat spot (compression set) resists rolling of the load and is therefore detrimental. Compression set may be overcome with rigid rollers, but rigid rollers require that an uneven spot of the pallet must climb up over the roller and as a result may become hung up on such a roller and prevent conveying. Rolling resistance of a conveyor roller for a gravity rollerway conveyor is defined as the pull required to move a load supported by such a roller, as measured at substantially zero speed to eliminate the effect of hysteresis. Thus, hysteresis will not affect the rolling resistance value of tire materials, which rolling resistance value varies greatly for different elastomeric materials used for roller tires. While hysteresis is a desirable property for speed control, rolling resistance is almost always an undesirable property, but a necessary evil of having a resilient tire. Rolling resistance will increase, in general, for an increase in wheel load, which is undesirable for a gravity conveyor. Also, rolling resistance to the start up of a stored load will increase substantially with increased compression set.

If the inclination of a particular gravity conveyor is set up so that a load under restraint will reliably start moving when the restraint is removed (that is the inclination is sufficiently great) while at the same time the load will not gain excess speed over the length of its movement (that is, the inclination is sufficiently small) with the satisfactory compromise of these conflicting characteristics, the conveyor may be totally unsuited for a load of substantially different weight per wheel. Use in low temperature environments greatly complicates this problem.

SUMMARY OF THE INVENTION

It is an object of the present invention to provide a gravity rollerway conveyor that will operate satisfactorily in low temperature storage environments and overcome the above mentioned problems.

The gravity rollerway conveyor employs two inclined flights of undriven rollers for storing a plurality of serially arranged loaded pallets, particularly in a cold storage environment. A stop is provided at the lower end of the conveyor to hold the pallet stationary in storage so that the pallet support surfaces that engage the rollers in storage engage rollers that do not have any appreciable compression set, so that when the restraint is removed, the pallets may easily start up, that is start rolling to advance along the conveyor after the removal of the lowermost pallet and load. While moving, the pallet support surfaces move from the rollers with no appreciable compression set to engage rollers that have elastomeric surfaces that have desirable characteristics due to their elasticity, and most desirably have hysteresis for speed control, while at the same time necessarily having relatively high compression characteristics. The high compression set characteristics of these latter elastomeric rollers is not particularly undesirable, because they will only briefly engage the pallet support surfaces during movement of the pallet and will not engage the pallet support surfaces during storage.

BRIEF DESCRIPTION OF THE DRAWINGS

Further objects, features and advantages of the present invention will become more clear from the following detailed description of a preferred embodiment associated with the accompanying drawing, wherein.

DETAILED DESCRIPTION OF A PREFERRED EMBODIMENT

While the present invention is applicable in a broad sense to many different environments, it is particularly advantageous in cold storage, with cold storage being defined as storing at temperatures below freezing, that is below 32° F.

Figure 1:
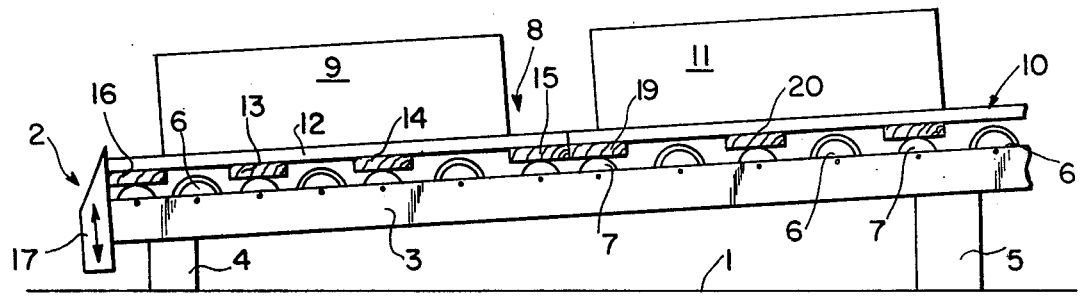
FIG. 1 is a side elevation view of a gravity rollerway conveyor employing the features of the present invention.

The gravity rollerway conveyor and storage facility shown in FIG. 1 is supported on a support surface such as a floor 1 of a cold storage room. Two horizontally spaced and parallel conveyor rails 3 (only one being shown since the other is identical and such structure is convention per se) are stationarily supported by forward supports 4 and rearward supports 5, with the forward supports 4 being of less height than the rearward supports 5, so that the two rails 3 are in a common plane that is inclined slightly downwardly in the forward conveying direction towards the left of FIG. 1. Each of the rails 3 mounts a plurality or flight of undriven, that is freely rotatable, rollers 6 and 7 along its conveying length, which rollers 6 and 7 have outer or upper load supporting surfaces that generally lie adjacent or in a common plane that is upwardly spaced from and parallel to the previously mentioned inclined plane.

A forwardmost pallet 8 contains a load 9, and in an abutting engagement to the rear thereof is another pallet 10 carrying a load 11. These pallets may be generally of any type of construction, although such pallets are usually of a few standard designs. Conventionally, the pallets employ a load engaging structure 12 as shown in pallet 9, and for example when constructed of wood, they employ a plurality of parallel spaced boards 13, 14, 15, 16 that are secured to the load engaging structure 12 and which boards 13–16 accordingly engage the rollers 6, 7 of the conveyor. A stop 17, as shown in FIG. 1, retains the forwardmost pallet 8 in the storage position shown in FIG. 1, while other suitable mechanisms or the pallet 8 itself retains the upstream pallets beginning with pallet 10 in a similar storage position. With standardized pallets, the positioning of the roller engaging support surfaces of the pallets will thereby be fixed in the storage position.

The load 9 may be removed with or without its pallet, and if without, the pallet 8 is subsequently removed when needed. Since the left end of the conveyor shown in FIG. 1 is the unloading end, it is desirable to have the next pallet 10 moved to the position formerly occupied by the first pallet 8. When the first pallet 8 is removed, the second pallet 10 and all upstream pallets (not shown) move one pallet length forward in the conveying direction so that they may be consecutively removed. If desired, the stop 17 may employ an actuator 18 to move it between a pallet engaging position and a pallet release position, or it may be fixed. Also, there may be a release and hold mechanism for the second pallet 10 in FIG. 1.

The above structure is basically conventional and has the problem, which is particularly severe in cold storage, that when the load 9 and pallet 8 are removed, the pallet 10 must reliably start up solely under the forces of gravity. Elastomeric rollers have desirable properties in such a conveyor, but they are subject to creep wherein they will progressively deform the longer that the load engages them during storage, and after the load is removed, they will retain their deformation either permanently or slowly return to their cylindrical shape, with such retention or slow return being a compression set characteristic. This compression set is highly undesirable and greatly amplified with a lowering of the environment temperature, to where it is a serious problem in cold storage. Further, compression set and creep vary with the applied load.

Pallets for specific installations are standardized, and for example the pallets may be 40 inches long with front and rear bottom support boards extending 6 inches each in the direction of the length of the pallet. Two to four center support boards totalling approximately 11 inches in the direction of the length of the pallet, and a remainder of 40 inches being open spaces. In the specific example of pallets shown in FIG. 1, the pallets employ four bottom support boards of a width of 6 inches each, that is extending 6 inches in the direction of conveying; therefore, with a 40 inch pallet, the open spaces between such bottom support boards 13, 14, 15, 16 would each be over 5 inches. It is thus seen that there is a pattern of support boards and spaces along the entire length of the rollerway gravity conveyor when the conveyor is filled with pallets held stationary in the storage position of FIG. 1. According to the present invention, pallet speed braking means or speed retarding means are placed in one or more of such spaces that are open, that is do not engage the pallet, during storage. Therefore, a braking device would be associated with one or more of the rollers 6.

There are various types of braking devices for rollerway conveyors, for example, there are those that employ hysteresis elastomeric tire materials as mentioned above, others that employ a retarding fluid that resists rotation of the rollers, and still others that employ some type of friction surface that is fixed to engage resiliently or adjustably the roller to retard its turning. In all of such retarders or braking devices, the roller has an elastomeric surface. With the elastomeric tire according to the present invention being in the space between support boards during storage of pallets, they will only briefly engage the support boards with rolling contact during movements of the pallets from one storage position to another storage position, so that there is insufficient time for effects of creep to be material or for the effects of compression set to be material. Therefore, such elastomeric roller 6 may have very substantial creep and compression set characteristics without any attendant disadvantages.

Figure 2:
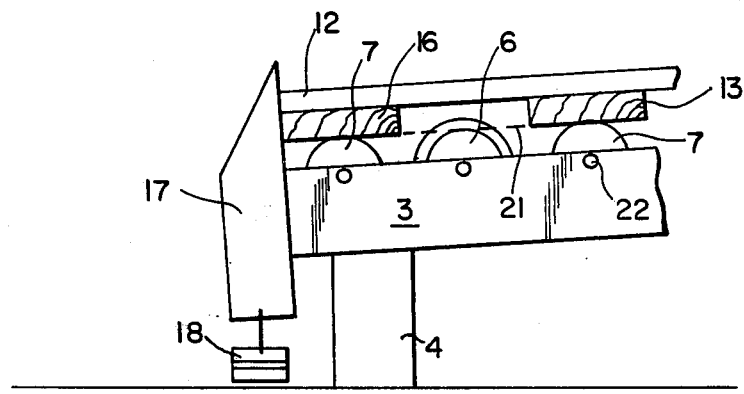
FIG. 2 is a partial and enlarged view of the lowermost end of the conveyor shown in FIG. 1 with storage of pallets thereon.
Figure 3:
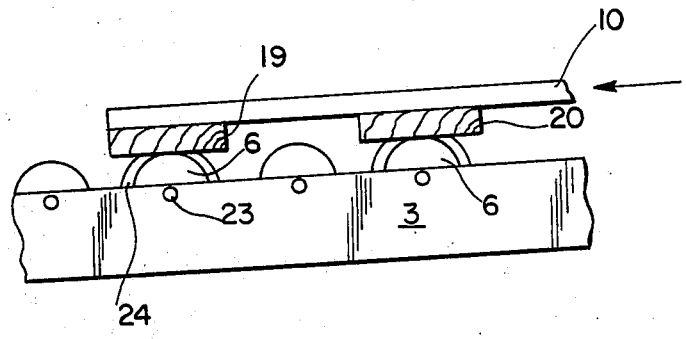
FIG. 3 is an enlarged partial elevation view of the conveyor of FIG. 1 further upstream from the position shown of FIG. 2, with a pallet partially shown moving from one storage position to another storage position.

As a specific preferred embodiment of the present invention, the rollers 6 are constructed, as shown in FIGS. 2 and 3, of a hub freely rotatably mounted on an axle 23 rotatably mounted within the rail 3, and which hub is covered with an elastomeric tire 24 having substantial hysteresis properties. The resilient tire 24 is preferrable of a urethane construction having a hardness between 60A and 90A or most preferably between 65A and 90A Shore durometer. Specifically, one or more of the rollers may be constructed according to the disclosure of U.S. Pat. No. 4,006,810 taken together with the disclosure of U.S. Pat. No. 3,443,674.

The rollers 7 that engage the support boards of the pallets during storage are constructed with no substantial compression set, that is with a compression set of less than 5 percent. For cold storage usage, the compression set is preferably less than 5 percent at temperatures below 32° F. and preferably less than 5 percent at temperatures below 0° F. By way of specific example, the rollers 7 may be constructed with an outer support board engaging surface of stainless steel or other metal, or constructed of a rigid synthetic resin. Further, there are known elastomeric materials that may be used as tires on the rollers 7 without imparting any substantial compression set. Such elastomeric material may be a specific formulated Salistic from Dow Corning Company, which material is a silicone rubber bearing identification number 4506-U. However, natural rubber and most synthetic rubbers have very substantial compression set characteristics so that without a specific formulation, elastomeric tires conventionally employed for gravity conveyors would be unsuitable for the rollers 7 according to the present invention.

As shown in detail in FIG. 2, only the rollers 7 engage the support boards of the pallet and such rollers do not have any appreciable compression set, while elastomeric rollers 6, at least some of which provide a retarding or brake function do not engage the support boards during storage. In FIG. 3, the pallet 10 is moving from its position as illustrated in FIG. 1 towards the position formerly occupied by pallet 8 in FIG. 1 after pallet 8 and its load have been removed from the conveyor, and it is seen that during such movement the rollers 6 have rolling contact with the support boards of the pallet.

As shown in FIGS. 2 and 3, if the rollers 7 have rigid pallet engaging surfaces, it is desirable to provide their top surfaces in a common plane 21 that is spaced below the outer surfaces of the elastomeric rollers 6, so that the elastomeric rollers 6 will deform as shown in FIG. 3 when they engage the moving pallet to compensate for unevenness in the pallet and provide their retarding function.

While a preferred embodiment of the present invention has been illustrated with variations, for the advantages of the specific details and to illustrate the broader concepts, further embodiments, variations and modifications are contemplated all within the spirit and scope of the following claims.

What is claimed:

1. A gravity rollerway conveyor for use at low temperatures to store pallets and deliver them one at a time to the front lower end of the conveyor, comprising: a support; at least two downwardly and forwardly inclined flights of undriven rollers having their upper support surfaces adjacent an inclined support plane and each having a fixed generally horizontal axis of rotation generally perpendicular to its flight; means at the forward end of said rollerway conveyor for stopping and positively holding at a fixed location the forwardmost one of a plurality of loaded pallets serially extending along the conveyor; said flights of rollers having alternating groups of first rollers and second rollers with said first rollers being laterally aligned with each other and said second rollers being laterally aligned with respect to each other as between the flights; all of said first rollers having means forming their load engaging surface that are substantially free of any appreciable compression set, and all of said second rollers having means forming their load engaging surface being constructed of elastomeric material having an appreciable load compression set, at the low temperatures; and the spacing between and positioning of said rollers being such that when said rollerway conveyor is filled with serially arranged and stored stationary pallets, the support surfaces of said pallets will engage only said first rollers.

2. The rollerway conveyor of claim 1, wherein said second rollers include rollers having an elastomeric tire with substantial hysteresis properties so as to constitute means for controlling the descent speed of loaded conveyors within a narrow range of speed such that pallets moving faster than said range of speed will be slowed to said range of speed and pallets moving slower than said range of speed will increase in speed under the force of gravity to within said range of speed, for the design load range of said pallets, and at said low temperatures.

3. The gravity rollerway conveyor of claim 2, wherein said first rollers have rigid outer surfaces for engaging the pallet support surfaces being stored on the conveyor without any appreciable deformation; and the elastomeric tires of said second rollers having a common plane tangent to their outermost support surfaces that is parallel to and spaced above the common plane tangent to the outermost support surface of said first rollers.

4. The gravity rollerway conveyor of claim 1, wherein said first rollers have rigid outer surfaces for engaging the pallet support surfaces being stored on the conveyor without any appreciable deformation; and the elastomeric material of said second rollers having a common plane tangent to their outermost support surfaces that is parallel to and spaced above the common plane tangent to the outermost support surface of said first rollers.

5. The method of storing and conveying a plurality of loaded pallets on a gravity rollerway conveyor, comprising: providing a plurality of pallets, each of which has a plurality of spaced lowermost support surfaces separated from each other by areas free of support; providing loads on the uppermost portion of each of said pallets; serially arranging said pallets on an inclined gravity rollerway conveyor having parallel and spaced flights of undriven rollers supportingly engaging the pallets with the loads thereon, with each of said rollers having a fixed generally horizontal axis of rotation generally perpendicular to its flight; providing a stop at the forwardmost end of the rollerway conveyor for positively retaining the forwardmost loaded pallet at a fixed location on the conveyor so that all of the loaded pallets may be stored on the conveyor at corresponding fixed locations until such time as they are needed; maintaining the loaded pallets on the rollerway conveyor at a cold storage temperature below freezing; during cold storage, engaging the lowermost support surfaces of the loaded pallets only with rollers of a first group having pallet engaging surfaces that are substantially free of compression set; removing the load on the forwardmost pallet and the forwardmost pallet, and advancing by the force of gravity the remaining loaded pallets forwardly on the gravity rollerway conveyor from their stored position for a distance forward substantially corresponding to that of the length of the pallet as measured in the direction of conveying as determined by the stop; and during said step of advancing, supporting said pallets on a second group of rollers having their pallet engaging surfaces provided with an elastomeric material having substantial compression set properties.

6. The method of claim 5, including providing each roller of said second group of rollers with an elastomeric pallet engaging surface having substantial hysteresis properties such that pallets moving faster than a fixed narrow range of speed will be slowed to said range of speed and pallets moving slower than said range of speed will increase in speed under the force of gravity to within said range of speed, for the design load range of said pallets.

7. The method of claim 6, including providing each roller of said first group of rollers with rigid outer surfaces for engaging the pallet support surfaces being stored on the conveyor without any appreciable deformation; and mounting said second group of rollers so as to have a common plane tangent to their outermost support surfaces that is parallel to and spaced above the common plane tangent to the outermost support surface of said first group of rollers.

8. The method of claim 5, including providing each roller of said first group of rollers with rigid outer surfaces for engaging the pallet support surfaces being stored on the conveyor without any appreciable deformation; and mounting said second group of rollers so as to have a common plane tangent to their outermost support surfaces that is parallel to and spaced above the common plane tangent to the outermost support surface of said first group of rollers.

* * * * *